(12) United States Patent
Luthi et al.

(10) Patent No.: US 6,810,574 B1
(45) Date of Patent: Nov. 2, 2004

(54) METHOD FOR THE PRODUCTION OF LAMELLA PACKETS FOR ADJUSTABLE STEERING COLUMNS

(75) Inventors: Rudolf Luthi, Niederwangen (CH); Hans Johr, Kehrsatz (CH); Urs Graf, Bosingen (CH)

(73) Assignee: Adval Tech Holding, AG, Niederwangen (CH)

( * ) Notice: Subject to any disclaimer, the term of this patent is extended or adjusted under 35 U.S.C. 154(b) by 72 days.

(21) Appl. No.: 10/110,494
(22) PCT Filed: Sep. 6, 2000
(86) PCT No.: PCT/CH00/00473
§ 371 (c)(1), (2), (4) Date: Jul. 16, 2002
(87) PCT Pub. No.: WO01/28710
PCT Pub. Date: Apr. 26, 2001

(30) Foreign Application Priority Data

Oct. 20, 1999 (CH) ............................................. 1919/99

(51) Int. Cl.⁷ ......................... B21J 15/02; B21D 39/00; B21D 35/00
(52) U.S. Cl. .................. 29/525.06; 29/524.1; 29/469.5
(58) Field of Search .......................... 29/525.06, 524.1, 29/469.5, 428, 429, 430, 432, 426.1; 464/95; 264/273, 277

(56) References Cited

FOREIGN PATENT DOCUMENTS

| DE | 902586 | 7/1949 |
|----|--------|--------|
| DE | 86327887 | 6/1987 |
| DE | 4409556 | 9/1995 |
| DE | 19609263 | 9/1997 |
| DE | 10002295 | * 7/2001 |
| EP | 0802104 | 10/1997 |
| EP | 1079499 | * 2/2001 |
| GB | 401718 | 11/1933 |

* cited by examiner

Primary Examiner—John C. Hong
(74) Attorney, Agent, or Firm—Tarolli, Sundheim, Covell & Tummino L.L.P.

(57) ABSTRACT

The invention relates to a method for producing lamella packets (60, 70) of the type normally used in adjustable steering columns in automobiles and which comprise a soft lamella (71) made of soft sheet metal material and at least one layered hard lamella (71) placed on top of said material. The lamella (71, 74) are connected by at least one rivet made of soft lamella (71). The method is characterized by the use of presses (110, 120) positioned one after the other. A soft lamella (71) is formed and stamped out of a strip (111) of said softer material in the first press (110) at a rate dictated by the press (110). Soft lamella (71) produced in this matter are transported to the second press (120). At least one hard lamella (72, 74) is completely formed in a second press (120) from a band (121) of harder sheet material and then stamped. Said hard lamella is placed over a soft lamella (71) and a rivet connection is produced.

8 Claims, 4 Drawing Sheets

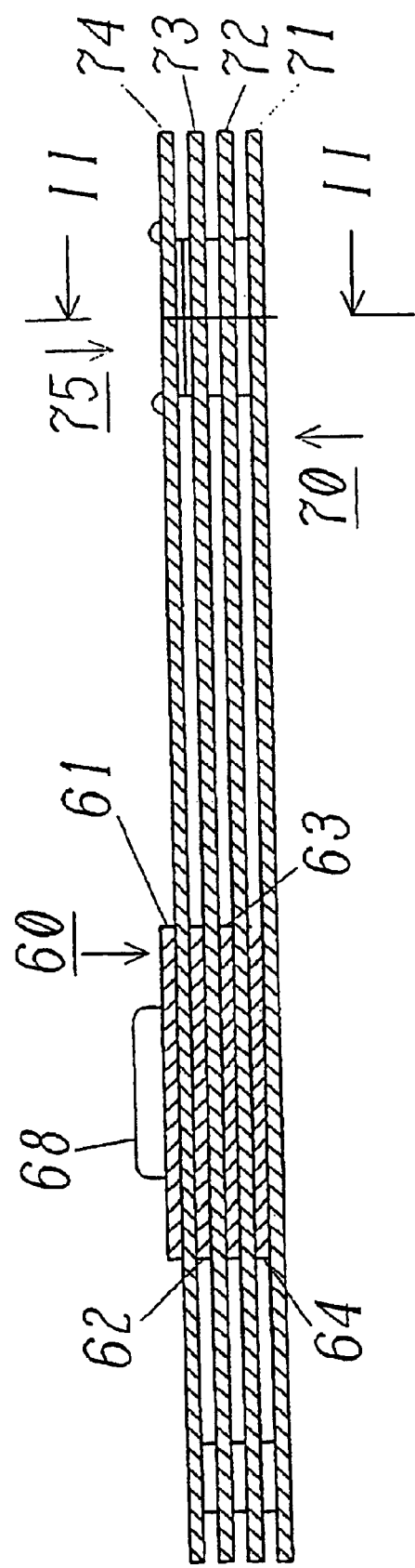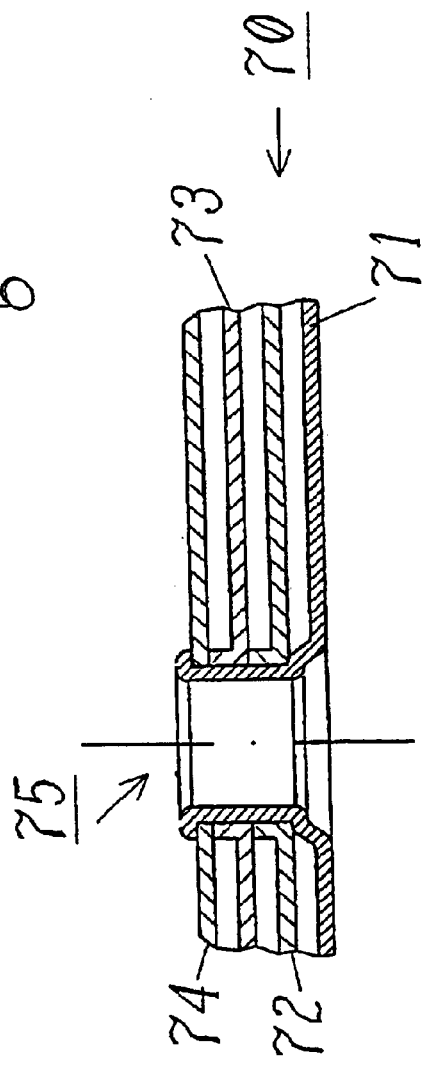

METHOD FOR THE PRODUCTION OF LAMELLA PACKETS FOR ADJUSTABLE STEERING COLUMNS

TECHNICAL FIELD

The present invention relates to a method for producing lamella packets of the type normally used in adjustable steering columns in automobiles, which prevent slippage and unintended adjustment of the steering column by means of a plurality of friction surfaces. The lamella packets comprise a soft lamella made of a relatively soft sheet metal material and at least one hard lamella placed thereon and made of a relatively hard sheet metal material. The lamellae in the packets are joined by at least one rivet, which is formed, respectively, from the soft lamella.

PRIOR ART

Such lamella packets are known in the art and comprise on the one hand packets with so-called longitudinal lamellae and on the other hand packets with so-called height lamellae. The individual lamellae within the packets are spaced apart by a distance corresponding approximately to their thickness. One packet of longitudinal lamellae and one packet of height lamellae, respectively, form an associated pair. The two packets of each pair are then pushed together such that longitudinal lamellae and height lamellae alternate in the stack. On their mutual contact surfaces, the lamellae are in part provided with specially structured friction surfaces.

A pair each of the aforementioned lamella packets is arranged on either side of a so-called guide box, which holds the bearings for the steering column. Each longitudinal lamella packet is fixed to the guide box by means of fastening eyes, while each height lamella pair is mounted to a support strap, which in turn is fixed to the chassis, also by means of fastening eyes. A tension bolt penetrates the guide box as well as all the lamellae. For this purpose, guide slots are provided on the lamellae.

The adjustability of the steering column is due to the fact that the mutually meshing lamella packets can be displaced as well as pivoted relative to one another. The displacement or pivoting range is limited by the length of the aforementioned guide slots in the lamellae. To fix the steering column in a desired position, the tension bolt is tightened so as to press together the aforementioned friction surfaces on the lamellae.

It goes without saying that—for a given tension force of the tension bolt—the resulting total friction force or holding force can be correlated with the number of lamellae in the lamella packets and adjusted in a simple manner by selecting this number.

To keep the lamellae in the prior art lamella packets spaced at the desired distance, some of them are provided with a collar that is formed out of the lamellar plane in the area of the aforementioned fastening eyes. The initially mentioned rivet by which the individual lamellae of each packet are held together is also formed by such a collar, which is shaped on one of the two outermost lamellae of each packet—the so-called soft lamella—at one of the fastening eyes, to the point where it is capable of penetrating the corresponding fastening eyes of the remaining lamellae. On the far side of the opposite outermost lamella, this collar is then shaped outwardly around the edge of the fastening eye of that lamella.

DESCRIPTION OF THE INVENTION

The invention, as described in the claims, defines a manufacturing concept (method) that permits efficient automatic production and assembly of the lamella packets of the described type.

According to claim 1, this method is characterized, in particular, by the use of two successive presses. At a rate defined by the first press

- a soft lamella is completely formed and stamped from a strip of the softer sheet metal material in the first press,
- a soft lamella thus produced is transported to the second press,
- at least one hard lamella is completely formed and stamped from a strip of the harder sheet metal material and placed over a soft lamella in the second press, and the riveted connection is produced.

BRIEF DESCRIPTION OF THE FIGURES

The invention will now be described in greater detail by means of an exemplary embodiment with reference to the drawing in which FIG. 2 shows the two lamella packets in cross section (I-I in FIG. 5*b*), FIG. 3 is an enlarged detail (section line II-II in FIG. 2) of a lamella packet with a riveted connection.

METHODS FOR IMPLEMENTING THE INVENTION

Figure 1:
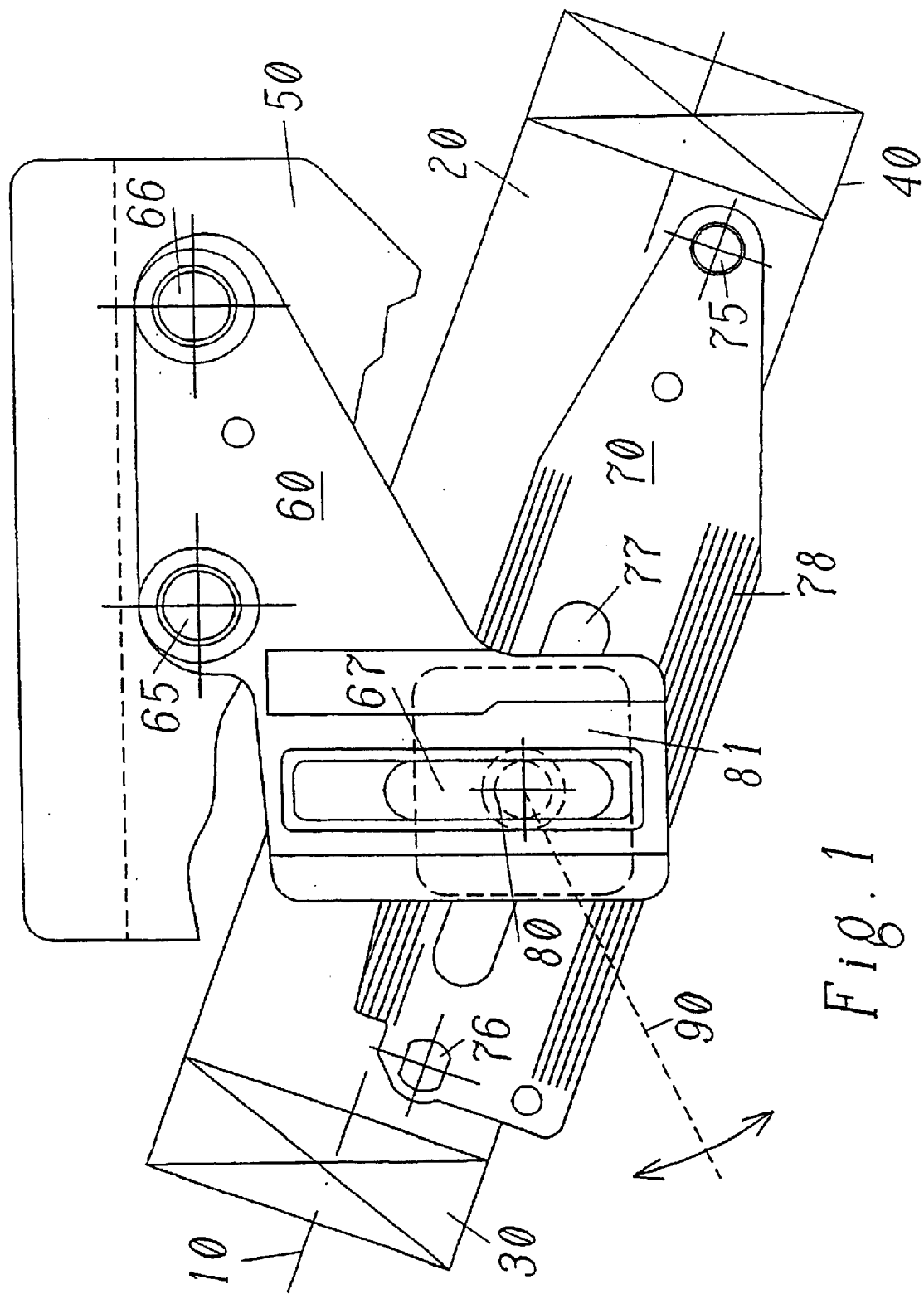
FIG. 1 shows the core piece of an adjustable steering column in an automobile with a packet of longitudinal lamellae and a packet of height lamellae.

FIG. 1 illustrates an arrangement of the above-described type. 10 identifies the axis of a steering column, 20 a guide box, 30 and 40 two bearings for the steering column inside the guide box, 50 a partially depicted support strap fixed to the chassis and arranged bridge-like over the guide box 20, and 60 and 70 two lamella packets. Lamella packet 60 is fastened to support strap 50 by means of two eyes 65, 66 and lamella packet 70 to guide box 20 by means of two eyes 75 and 76. A corresponding pair of lamella packets, not visible in FIG. 1, is arranged and fixed behind guide box 20 in the same manner as pair 60 and 70. The lamellae of packet 60 have a vertically extending guide slot 67 for adjusting the height of the steering column and are therefore referred to as height lamella. A corresponding guide slot 77, but substantially horizontal, is also provided in the lamellae of packet 70 and is used to adjust the steering column in longitudinal direction. The lamellae of packet 70 are therefore referred to as longitudinal lamellae. A tension bolt 80 that is held in the guide box penetrates the guide slots 67, 77 of lamella packets 60 and 70, that is to say of both pairs in front of and behind guide box 20. When tension bolt 80 is loosened, the longitudinal lamellae, and with them, via guide box 20, the steering column can be displaced and pivoted in height and length relative to the height lamellae and thus, via support strap 50, relative to the chassis. The adjustment range is defined and limited by guide slots 67 and 77. The steering column can be locked in each desired position and pivot position of the adjustment range by tightening tension bolt 80. This may be accomplished, for instance, by means of a schematically indicated locking lever 90. Tightening causes the friction surfaces of the lamellae to be pressed together.

Figure 5A:
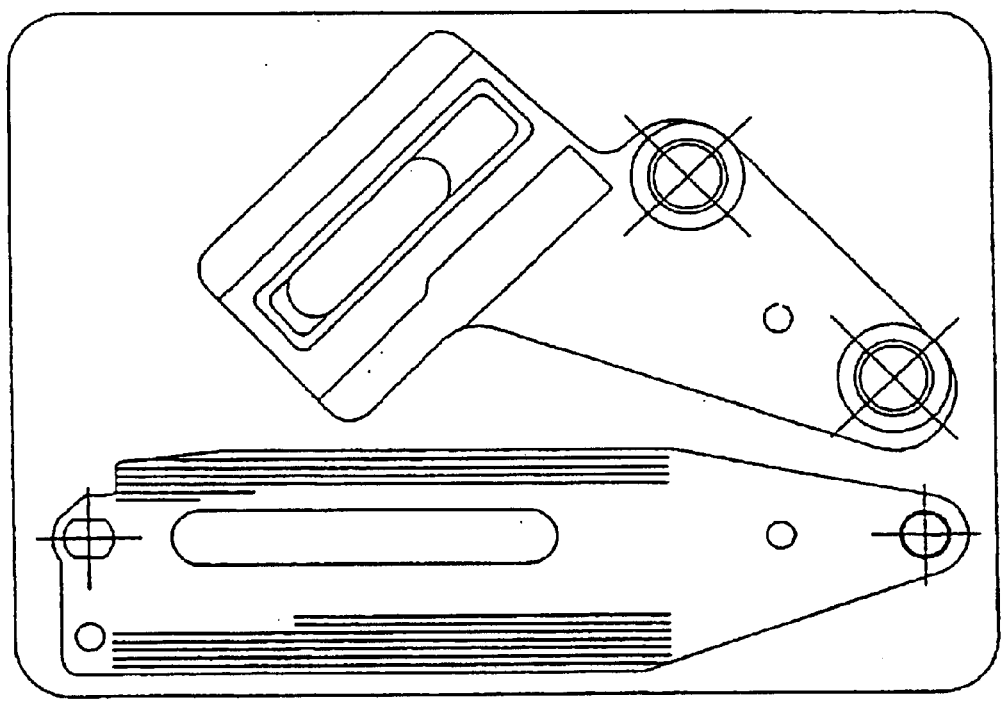
Figure 5B:
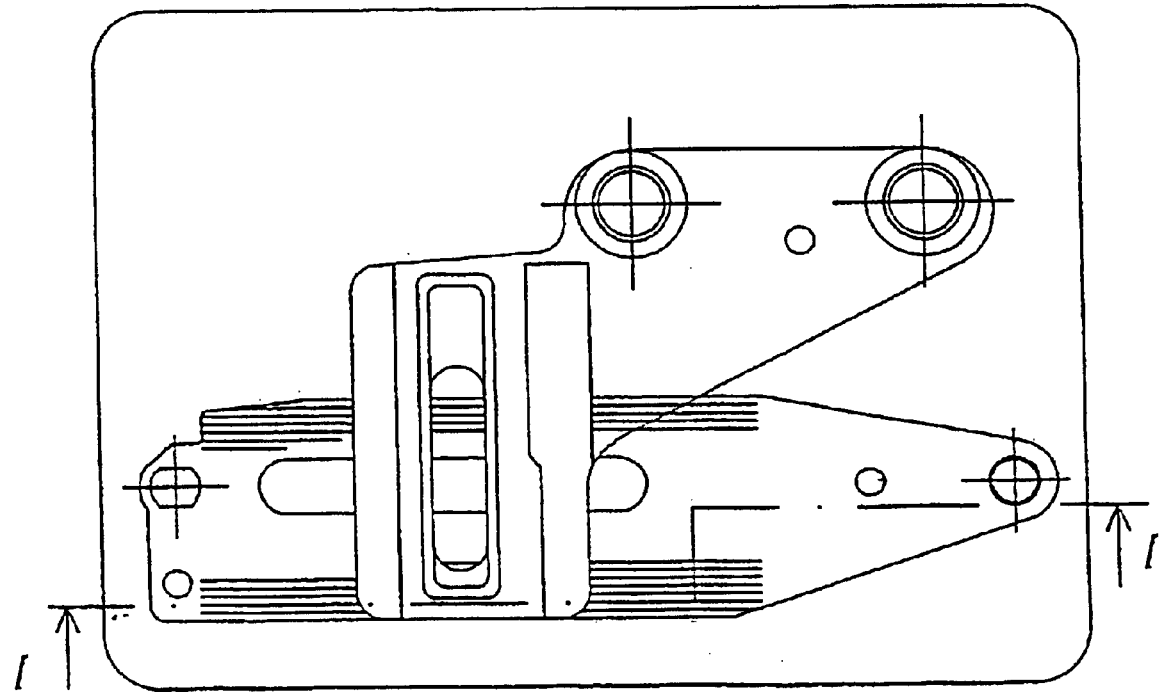

FIG. 2 is a section along line I-I in FIG. 5b) through the two lamella packets 60 and 70, shown here with four lamellae 61–64 and 71–74, respectively. In principle, there could also be only two or three lamella, or possibly more. Nor does the number of lamellae in the two packets have to be the same. As may be seen, the individual lamellae 61–64 and 71–74 of the two packets 60 and 70 are spaced apart at a distance that corresponds approximately to their thickness. Thus, the packets can mesh such that a lamella of one packet is followed by a lamella of the other packet in the stack. The mutual distance of the lamellae is defined and maintained by collars, which are formed on three (61–63 and 71–73) out of the four (61–64 and 71–74) lamellae of each packet, as shown in FIG. 2, along the edges of eyes 75 and 78 (as well as 65 and 66). In the area of their mutual contact surfaces, the lamellae may be provided with some structuring, corrugation, or the like (78 in FIG. 1) to increase their mutual frictional resistance. The uppermost lamella 61 of packet 60 is also provided with a trough-like shaping 68 around guide slot 67, which serves as a guide for head 81 of tension bolt 80.

FIG. 3 shows the area of eye 75 of lamella packet 70 in cross section (II-II in FIG. 2). The aforementioned collars are clearly visible here. FIG. 3 further shows a rivet connection, which holds the lamella packet 70 together. To form this rivet connection, the material of the lowest lamella 71 is pulled up far enough that it penetrates all the remaining lamellae 72–74 and can be shaped around the topmost lamella 74. A corresponding rivet connection is provided in eye 66 of packet 60.

Due to the material deformation required to form the rivet connection, which can be quite substantial In part depending on the number of lamellae within the packet, the corresponding lamella, e.g. lamella 71, is made from a sheet metal material that is slightly softer and can therefore be shaped more easily than the material used for the remaining lamellae. The latter material should be relatively hard so that the aforementioned corrugation or structuring of the friction surfaces is durable. For this reason, the individual lamella packets each comprise a soft and one or more hard lamellae.

Figure 4:
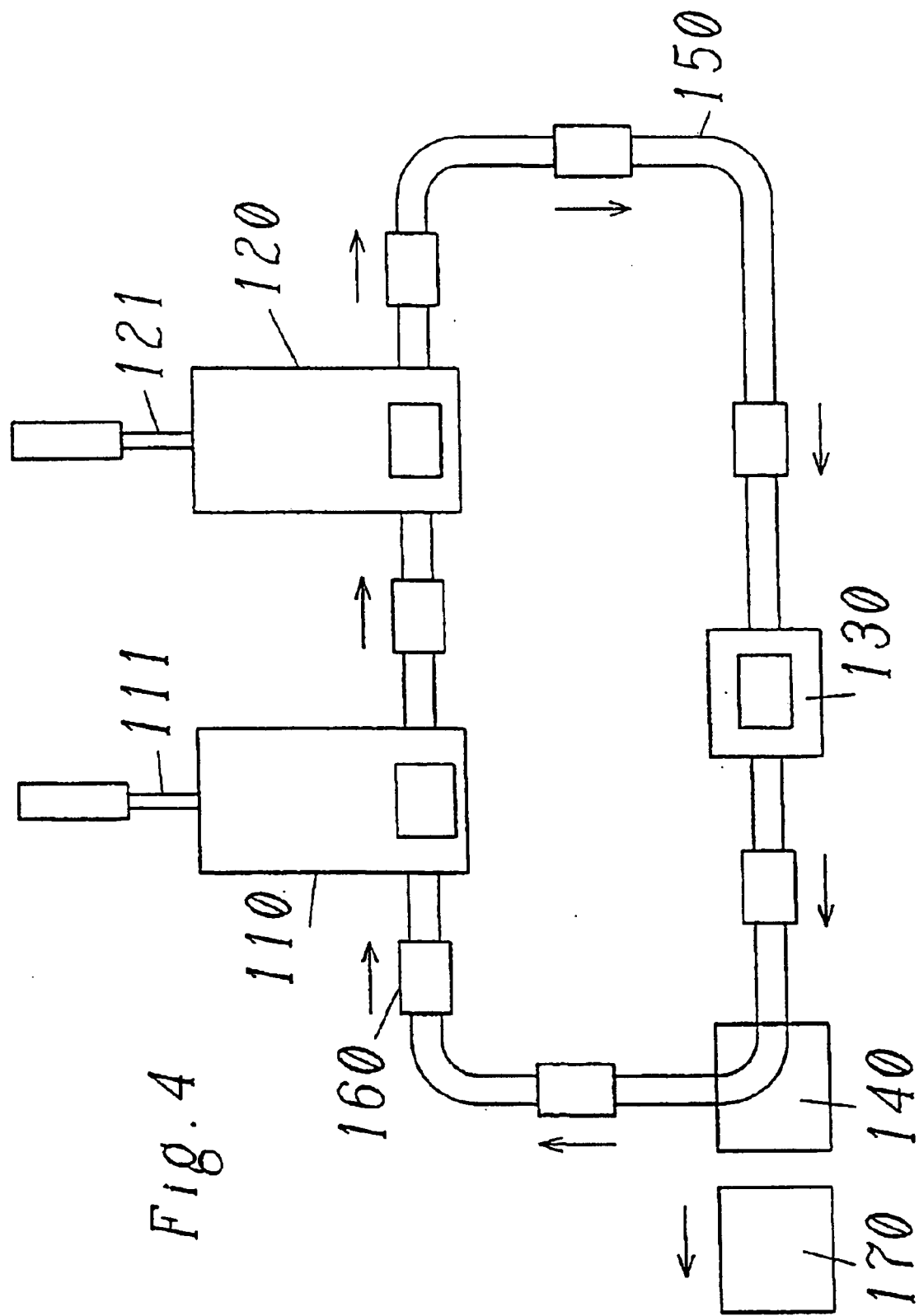
FIG. 4 is a schematic representation of a system to implement the method according to the invention, and FIG. 5 under a) and b) shows a top view onto a work holder used in the arrangement according to FIG. 4, with a packet of height lamellae and a packet of longitudinal lamellae.

FIG. 4 shows a system for implementing the method according to the invention, which permits efficient automatic production and assembly of lamella packets of the above-described type.

The system of FIG. 4 comprises two presses 110 and 120, a handling station 130, a packing station 140, and a conveyor system 150 connecting all these elements in a closed circuit. A plurality of work holders, only one of which is identified as 160, circulate within the-circuit in the direction of the arrows. The first press 110 is supplied with an endless strip 111 of a relatively soft sheet metal material to produce soft lamellae and the second press with an endless strip of a relatively hard sheet metal material 121 to produce hard lamellae.

In front of press 110 the work holders 160 are empty. At the rate dictated by the first press 110, one empty work holder 160 is introduced into press 110, while another that has just been loaded is removed therefrom and transported to the second press. In the first press 110, two soft lamella (a height lamella and a longitudinal lamella) are stamped in parallel from sheet metal material 111 and completely shaped including the collar for the aforementioned rivet connection in several sequential steps (one step per cycle) by means of a so-called progressive die, and are placed side by side on the empty work holder present. Final separation from the strip takes place only in the last step.

At the rate determined by the first press 110, a work holder carrying two soft lamellae side by side is introduced into the second press 120 one station downstream, while another that has just been loaded is removed therefrom and transported to the handling station 130. In the second press 120, essentially the same process takes place as in the first press 110, except that here hard lamellae are produced from the harder sheet metal material 121 and are placed onto the work holder over the previously deposited soft lamellae. In the last step executed in the second press 120, the rivet connection is produced by shaping the corresponding upwardly protruding collar on the soft lamella around the hard lamella.

If the lamella packets to be produced are intended to comprise several hard lamellae, the second press 120 must be operated at a correspondingly higher rate than the first press. A problem results from the fact that the hard lamellae of the same packet, as illustrated also in the example of FIG. 3, are shaped differently from one another, especially with respect to the spacer collar and possibly also with respect to their structuring on the friction surfaces. This can be resolved, however, by using a controlled progressive die, which is capable of executing different actions in the same position in consecutive steps. Consequently, if several hard lamellae are used, the collar on the soft lamella to produce the rivet connection can be shaped only when the last hard lamella is placed on the stack and not before.

In handling station 130, the two lamella packets lying side by side on work holders 160 as illustrated in FIG. 5a are pushed together into their functional position on work holders 160 as shown in FIG. 5b. To accomplish this without problems, a type of comb precisely determines the spacing of the lamellae.

In packing station 140, the lamella packets, which are pushed together in this manner in pairs and thereby save space, are finally transferred from the work holders 160 onto prepared blister pack holders 170. A single pack-holder can receive several lamella packets. The work holders 160 are then free to pick up new lamellae in the first press 110.

What is claimed is:

1. Method for producing lamella packets of the type typically used in adjustable steering columns in automobiles, which comprise a soft lamella made of a relatively soft sheet metal material and at least one hard lamella placed thereon and made of a relatively hard sheet metal material, and in which the lamellae are connected by at least one rivet formed, respectively, from the soft lamella, characterised by the use of two presses positioned to one after the other, wherein at the rate dictated by a first press; the soft lamella is completely formed and stamped from a strip of the relatively soft sheet metal material in the first press; the soft lamella thus produced is transported to a second press; the hard lamella is completely formed and stamped from a strip of the harder sheet metal material in the second press, placed over the soft lamella, and the rivet connection is produced.

2. Method as claimed in claim 1, characterized in that the lamellae are produced in the presses in several steps, particularly by using controlled progressive dies.

3. Method as claimed in claim 1, characterized in that the second press is operated at a rate that is increased by a multiple compared to the first press, for each cycle of the first press correspondingly more hard lamellae are produced and placed on the soft lamella in the second press, and the rivet connection is produced only with the last stroke of the second press.

4. Method as claimed in claim 1, characterized in that the lamellae are placed or stacked on mobile work holders in the presses and are transported on these holders.

5. Method as claimed in claim 4, characterized in that the work holders are operated in a closed cycle and prior to being returned to the first press are emptied by unloading the lamella packets into packing that is suitable for transport.

6. Method as claimed in claim 1, characterized in that the presses simultaneously produce height lamellae and longitudinal lamellae side by side and rivet them to form height lamella packets and longitudinal lamella packets, respectively.

7. Method as claimed in claim 6, characterized in that the simultaneously produced height lamella packets and longitudinal lamella packets are brought into mutual engagement by pushing them together in a station downstream from the second press.

8. Method as claimed in claim 7, characterized in that a comb is used to define the mutual spacing of the height lamellae in the height lamella packets and the longitudinal lamellae in the longitudinal lamella packets as the two packets are pushed together.

* * * * *